Patented Sept. 1, 1936

2,052,575

UNITED STATES PATENT OFFICE 2,052,575

METHOD OF FORMING ELECTRODES FOR ELECTROLYTIC CONDENSERS

Julius Edgar Lilienfeld, Winchester, Mass., assignor, by mesne assignments, to The Magnavox Company, Fort Wayne, Ind., a corporation of Arizona No Drawing. Application February 14, 1934, Serial No. 711,287

20 Claims. (Cl. 175—315)

My invention relates to a method of forming filmed metal electrodes specially adapted for use in electrolytic condensers.

This application is in part a continuation of my copending application Ser. No. 670,084, filed May 9, 1933, now Patent No. 2,021,455.

My invention has for its principal object the provision of an improved method of forming dielectric films on filming metals, such as aluminum or tantalum, to secure films having an exceedingly high resistance and stability even at voltages of 100–440 and higher, whether alernating or direct current, for indefinitely long periods of time whether employed in operation continuously or intermittently, and which will have a fast "comeback" after idling.

Specific objects and features will be made evident as the description progresses.

Before proceeding to describe my improved method, I will first point out the distinction which exists between two types of films or layers which can be produced.

One type, which I refer to as being an "active" film, is characterized by the fact that it is substantially a dielectric and remains a dielectric whether operated in dry air, moist air, or in an electrolyte. Such films can be obtained, for example, by electrolyzing an anode of a filming-metal, such as aluminum, in a solution of boric, citric, tartaric, or succinic acid, with or without the addition of a small amount of a salt of such an acid or a base. This treatment, in the case of an aluminum electrode, for example, produces what I believe to be an aluminum oxide film consisting of highly organized and associated aluminum oxide molecules, produced from initially formed aluminum hydroxide molecules by the action of the high intensity electrostatic field existing at the surface of the anode during the forming operation, which links together aluminum oxide molecules so as to resist subsequent conversion into the hydroxide form. Films of this type have a thickness of the order of magnitude of $10^{-4}$ to $10^{-5}$ mm., and their thickness is determined by the maximum voltage applied in forming, the limit imposed by the voltage not being exceeded even though the voltage is applied for an unlimited period of time.

A proper formation will result in an anode coated with a film so highly resistant to conversion to the hydroxide form that it will have the same capacity whether exposed to dry air or to air saturated with moisture. Hydration of the film causes an increase of capacity, power loss, and leakage current, and thus causes deterioration of the film. Hence the high degree of resistance to hydration (conversion to hydroxide form) is advantageous as it follows that this type of film possesses a high degree of resistance to deterioration.

In the case of a filmed anode employed in an electrolyte, the extent of hydration will depend upon the resistance of the film to hydration and upon the tendency of the electrolyte to produce hydration.

In my copending application Ser. No. 711,286 filed of even date herewith and since issued as Patent No. 1,986,779, I have described an improved type of film-forming electrolyte having a very minimum tendency to produce hydration of dielectric films employed therewith.

My present invention relates primarily to an improved method of forming the active type of film, to produce a dielectric film which initially has an extremely low leak and low power loss and which will also be exceptionally resistant to hydration and hence to deterioration. In the description and claims I will, for purposes of convenience, employ the term "film-forming" exclusively in the restricted sense of referring to capability of forming the active type of film described above.

The second type, which I refer to as an "inactive" film or layer, is characterized by being hydratable and is highly insulating only when dry and exposed to a dry medium. Such a film or layer can be formed by electrolyzing an anode of a filming-metal in a solution of sulfuric acid, phosphoric acid, a carbonate, etc., and in other ways. A characteristic of this type of layer is that it can be formed to any thickness without sparking. The thickness is not limited by the forming voltage, but can be regulated, and is dependent upon the concentration and temperature of the forming electrolyte, the current density, and the duration of treatment.

A double-layer type of electrode having very useful properties can be made as follows: A filming-metal electrode is first coated with an "inactive", or highly hydratable, layer, preferably to a thickness of about 1/1000 mm.; thoroughly washed; and then subjected to a forming treatment to produce an active film. The active film will be found to be underimposed beneath the inactive layer. The order of steps is irreversible, that is, the active film cannot be formed first and then be coated with the inactive layer, since forming progresses inwardly, and such an attempted procedure will only result in destroying the active film.

When in the hydrated state, the thin outer layer of such a double-layer electrode is, even at low voltages, quite conductive and will not act as a dielectric, and the capacity will be controlled by the underimposed active film. A transition layer appears to exist between the inactive layer and the active film, so that capacity measurements show a somewhat smaller capacity than on corresponding active non-underimposed films, but the inactive layer proper does not act as a series-capacity.

The outer layer behaves as a porous coating, which is permeable to fluid or plastic electrolytes utilized for forming or healing the active film. I do not mean that the outer layer is necessarily permeable to the electrolyte as a whole, since there will be sufficient "permeability" if the layer is rendered conductive and if healing of the underlying active film is permitted. The outer layer thus serves as a coating to mechanically protect the active film, without interfering with the forming or healing thereof, and will also prevent solid particles which may be present in an electrolyte in which the electrode is employed from coming in contact with the surface of the active film and thus reducing the sparking voltage.

One method of forming an inactive layer, given by way of example, is as follows: The electrode body, such as an aluminum sheet, is first thoroughly cleansed. Cold distilled water may be utilized for cleaning. Hot distilled water or any medium having an alkali characteristic should be avoided, as this will produce a thin film on the surface of the aluminum which will prevent proper success of the forming step. Hot distilled water which has been acidulated with a small amount of an acid, such as phosphoric acid or boric acid, is preferred.

The electrode is then operated as an anode in the electrolyte of 1/10 normal phosphoric acid at a temperature of 30–35° C., with the voltage regulated to produce a current density of about 5 ma. per square cm., for 30–45 minutes. If a higher current density is applied then the time may be shortened in proportion, or even more than in proportion, inasmuch as the thickness of the layer increases somewhat faster at higher current densities than at lower ones.

The electrode is now thoroughly washed to remove all traces of the electrolyte from the formed layer, as the presence of phosphoric acid will interfere with the subsequent formation of an active film. The formed surface may be sprayed with hot or boiling distilled water for 10–20 seconds, or immersed successively in two containers of boiling distilled water for ten minutes each. Washing can be accomplished with cold distilled water, but will take much longer.

The formed surface of the electrode will, as the result of this treatment, have the appearance of being coated with a tough skin.

Proceeding now with a description of my present invention, which is concerned primarily with the formation of an active film having improved characteristics, the following method is employed by me:

The electrode body, whether or not it has previously been coated with an inactive layer, is electrolyzed in a hot viscous semi-dry film-forming electrolyte. The electrode may previously be subjected to a preliminary forming operation in a nonviscous electrolyte capable of producing an active film, but such a step is purely optional and is unnecessary.

Before proceeding to describe the actual treatment steps which I have found it advantageous to employ, I will describe what is meant by the semi-dry viscous type of electrolyte to which I refer.

The dryness and viscosity of this electrolyte are such that the number and mobility of the hydroxyl ions present in the electrolyte will be as low as possible without preventing film formation and so will favor the building up of a very highly organized non-hydratable film.

It is my view that the attempt to obtain optimal condenser performance of a layer may be represented as an attempt to form tightly bound aluminum oxide chains from initially formed aluminum hydroxide molecules. This result I believe to be due to the high intensity electrostatic field existing at the surface of an electrode during the formation of a film. The greater the number and mobility of hydroxyl ions present in the electrolyte adjacent the surface of the film, the greater the hindrance to the formation of stable aluminum oxide molecule chains from which the OH radical is excluded. On the other hand, a certain hydroxyl ion concentration adjacent the electrode surface being formed is desirable in order to secure proper formation, and this I believe is due to the fact that aluminum hydroxide is formed as an intermediate in the formation of the aforesaid aluminum oxide chains.

Irrespective of theory, I have found that best results are obtained by employing a semi-dry viscous film-forming electrolyte.

Use is made by me of homogeneous highly polymerized plastic reaction products of water soluble polyhydric alkyl compounds and water soluble polybasic film-forming acids. The products are esters which are polymerized by the interlinking of the molecules into complex forms made possible by the presence of a plurality of replaceable radicals in both the polyhydric and polybasic materials utilized. The preferred compositions are uniform and have no suspended phase of solid particles, such as crystals; and are plastic in the sense of being coherent, amorphous and semisolid, in contradistinction to viscous liquids which do not retain their shape to any practical extent. The physical characteristics noted refer to the properties at room temperature.

The greater the number of hydroxyl and hydrogen radicals taking part in the esterification and polymerization, the greater the viscosity of the product as compared with that of the polyhydric alkyl compound employed; and this applies to hydroxyl radicals in the acid when a hydroxy-acid is used, since esterification can occur between such acid molecules.

At elevated temperatures, such as 85–95° C., these compositions have a syrupy consistency, which I denote by the term "viscous", and may be readily utilized in the formation of electrodes to be dipped therein.

I prefer to use the lower and less complex polyhydric alcohols, including both straight alcohols and alcohol ethers; such as the simple glycols, for example diethylene glycol; and glycerol; but higher polyalkyl and polyhydric water soluble alcohols may also be used, such as pentaerythrol, sorbitol, mannitol and dulcitol.

As examples of polybasic film-forming acids for use in this connection, I may mention boric acid; and water soluble hydroxy polycarboxylic acids, such as citric acid and tartaric acid. Each of these acids will produce truly plastic reaction and polymerization products.

Succinic acid is an example of a film-forming dibasic acid containing no hydroxyl radicals. It will form a plastic product with glycerol (trihydric), but with diethylene glycol (dihydric) it will form a viscous product which is not plastic. In the latter case a plastic product can be obtained by employing a more complex acid in conjunction with the succinic acid.

It will be evident that by employing mixtures of acids it is possible to obtain products of various degrees of plasticity from any given polyhydric compound.

I prepare the polymerized, plastic, reaction product by mixing the selected polyhydric compound and polybasic acid in approximately molecular proportions such that there is one hydroxyl (OH) radical to each acid (H) radical. This proportionality may be varied within fairly wide limits. By employing an excess of the polyhydroxy compound above that required for a strictly molecular proportionality, the final product can be made less viscous, which may be desirable in the case of products which otherwise might be harder to handle than is desirable.

The mixture is heated and during this heating the boiling point rises. The temperature is maintained at the boiling point until a boiling point is reached at which sufficient polymerization has occurred so that the product upon cooling to room temperature will be a plastic composition, preferably homogeneous and free from acid crystals. Heating will, in general, be required for a period of one to four hours, depending upon the rate at which heat is supplied to the mixture.

By employing a suitable catalyst the polymerization can be facilitated.

Water will be produced as one product, but will be largely driven out by the prolonged heating, and hence the product may be termed semi-dry.

Products produced with an acid alone have a lower hydroxyl ion concentration than I prefer, and in order to obtain a suitable film-forming electrolyte I accordingly increase the hydroxyl ion concentration by adding a small amount of water soluble alkali salt of a film-forming acid, such as borax, sodium citrate, sodium tartarate, etc.; or a water soluble base, such as sodium hydroxide or potassium hydroxide or other alkali hydroxide, with or without the addition of a small amount of water. It is generally necessary to employ a small amount of water, due to the high degree of dryness of the plastic composition resulting from the prolonged heating, the amount depending upon the extent to which the composition has been heated. The use of a salt, rather than a base, is preferred, since bases will often produce a certain amount of saponification. A salt which will interfere with the formation of an active film should be avoided, such as chlorides, sulfates, and phosphates, and hence I specify a salt of a film-forming acid.

The salt or base may be introduced after the polymerized product has been obtained, at an elevated temperature at which it will be fluid, or may be introduced into the initial mixture prior to reaction and polymerization.

The specific resistance of the film-forming electrolyte so produced may be used as an indication of the desired hydroxyl ion concentration, and I ordinarily adjust the latter so that a specific resistance in excess of about 1500 ohms/cm³, and preferably below about 10,000 ohms/cm³, is obtained at 90° C., which temperature is within the range ordinarily employed in forming the active film as previously described. At room temperature such electrolytes will have a specific resistance within the approximate range of 100,000–500,000 ohms/cm³, due to possessing an extremely high temperature coefficient of resistance.

A suitable electrolyte can be prepared as follows, given by way of example: Heat together 62%, by weight of glycerol and 38% of boric acid. Several hours heating will be required to reach a composition boiling between 170–175° C., at which temperature polymerization will readily occur. The temperature is then lowered to about 100° C. and a solution of equal parts by weight of water and borax, 5% of each relative to the weight of glycerol, is added. The resultant product will be viscous and possesses a specific resistance of about 6400 ohms/cm³ at 90° C.

As a second example, an electrolyte can be prepared by heating together 50%, by weight, of diethylene glycol, 23% of boric acid, and 27% of sodium tetraborate, to produce a reaction and polymerization product which will be plastic at room temperature. At 90° C. the product will be a syrupy liquid and the specific resistance will be about 2,000 ohms/cm³.

Polymerized products obtained by use of citric or tartaric acid have a higher viscosity and specific resistance than those obtained by use of boric acid, but may be reduced in specific resistance in the same manner, and also may be made use of by adding them to boric acid type products which have been made up and whose resistance it is desired to raise. A higher specific resistance than that of the products described in the two above examples is desirable when a peak formation voltage of higher than about 520 is used.

A more detailed description of this class of electrolytes will be found in my copending application Ser. No. 711,286 filed of even date herewith, and since issued as Patent No. 1,986,779.

The foregoing description of specific electrolytes is given by way of illustration and I do not intend to be limited thereby, since in accordance with my invention I may utilize, generally, film-forming electrolytes which are viscous and semi-dry at the elevated temperatures employed. I prefer, generally, to employ electrolytes having a specific resistance above 1500 ohms/cm³ and preferably below 10,000 ohms/cm³, at the hot forming temperature, since the specific resistance is in itself a factor of importance in permitting a high sparking voltage, but this is not a critical limitation to secure advantages, to a degree, in accordance with my invention. Electrolytes having specific resistances substantially in excess of 10,000 ohms/cm³ may be employed, although with an attendant increase in the amount of power required for forming a film.

An active film may first be substantially formed in the aforesaid hot viscous electrolyte by operating the electrode as an anode on direct current at a voltage which is gradually raised to a point where it is somewhat in excess of the maximum service voltage at which the electrode is designed to operate when embodied in a condenser. When designed to operate on alternating current, it should be borne in mind that the RMS voltage rating (as shown by a volt meter) will be specified so that the peak of the A. C.

service voltage will be somewhat lower than the peak of the formation voltage, and hence that a margin above the peak service voltage should be provided. The margin to be provided, to take care of fluctuations and surges, should not be unnecessarily great, as the thickness of the film depends upon the forming voltage and the thicker the film the less its capacity. When forming an electrode to have a service rating of 110 volts A. C. for use on commercial lines, the D. C. forming voltage should preferably not be higher than 175-200 volts, the excess voltage above the 155 peak voltage of the service rating being the margin provided. Similarly, an electrode designed for a service rating of 220 volts A. C. is preferably formed at about 380 volts D. C.

By a "hot" electrolyte I mean one which is at a temperature substantially in excess of room temperature. I normally employ a temperature of about 85-95° C., but even higher temperatures may be used.

The D. C. formation period depends upon the formation current, and may be completed in about five minutes with a current density of 6-8 ma. per square cm. for condensers that are to be operated at 110 volts A. C. For higher voltage condensers a longer period will be required due to the higher peak forming voltage needed. After the desired peak forming voltage has been reached, the voltage is held constant and the leak current will then drop as the formation continues. Formation is continued until the desired low leak is obtained. A leak of less than 0.3 ma. per square cm. in the hot electrolyte can be obtained, but it is of course not necessary that a leak as low as this be secured.

The electrode is next subjected to A. C. treatment in the same or similar hot viscous electrolyte. Where a number of electrodes are being simultaneously formed in the electrolyte tank, this may be conveniently done by dividing the electrodes into two opposed groups, each group having the same area, connecting the two groups to the respective end terminals of a transformer coil that is insulated from ground, and energizing the coil to produce the A. C. voltage and current necessary for the treatment.

The peak A. C. voltage used in this step should preferably be very close to the peak D. C. voltage employed in the preceding step, in order to obtain a film having a minimum power loss, and ordinarily I employ a peak voltage which is just slightly less. The A. C. treatment is continued for about 1-5 minutes.

The D. C. formation in the hot viscous electrolyte may be omitted, in whole or in part, irrespective of whether or not there has been a prior formation step. That is, the active film may be formed partly or entirely by A. C. in the hot viscous electrolyte. However, this will necessitate a regulation of the A. C. voltage until the capacity current due to the initial high capacity has been reduced, in order to prevent an excessive and undesirable flow of current. I prefer to substantially form the film with D. C. and then to finish up with A. C. in the manner described.

The A. C. treatment may be omitted and the film formed as far as possible with D. C. in the hot viscous electrolyte. Such a procedure will result in a better film than if no formation occurred in the hot viscous electrolyte, the film not increasing its capacity in operation, but the film will have a higher power loss when employed in a condenser and greater heating will occur.

It will thus be evident that formation in the hot viscous electrolyte, whether with D. C. or A. C., gives an improved result as such; and an improved result is also contributed by A. C. formation as such.

The forming operation described above will result in a low power loss film suitable for immediate use, the characteristic depending upon the procedure followed, but in accordance with my invention I employ in addition the following subsequent treatment.

I have found that it is advantageous to coat the formed active film with a viscous hydrolyzable film-forming electrolyte which will be retained to a certain extent by the film, and then to hydrolyze this viscous electrolyte by washing in water. The washing will remove surplus electrolyte and leave a hydrolyzed portion absorbed or adsorbed in the film, which improves the film, apparently by repairing imperfections or by facilitating repair during a subsequent forming step or when the electrode is operated in a condenser.

In order that this step may be performed with a minimum of extra labor, it is advantageous to employ a viscous hydrolyzable electrolyte in the preceding forming or treating step, so that the electrode may immediately thereafter be washed to secure the hydrolyzed product attached to the film. From the production standpoint it is advantageous, as a matter of economy, to heat the electrodes after removal from the forming tank, but before washing, for a few minutes in a tunnel kept at a temperature of nearly 100° C., collecting the viscous electrolyte which drips off for reuse in the forming tank.

The reaction and polymerization products of polyhydric alcohols, and the like, and film-forming acids, which I have described as suitable electrolytes for the hot treatment of an electrode, are characterized by being hydrolyzable and in addition are adhesive so that they will readily cling to the active layer. The products obtained by reaction and polymerization of diethylene glycol or glycerol and boric acid, with or without the addition of similar products, will be found especially suitable, since they readily hydrolyze and are quite adhesive.

Hence the step of hydrolyzing may be readily performed by conducting the preceding hot treatment in the aforesaid type of electrolyte and thereafter washing the electrode, preferably in hot distilled water to save time, although cold water may be employed.

This step may be employed to advantage whether or not the particular preceding forming steps described herein are utilized and may be omitted with an attendant loss of the improvement effected.

The next step which I prefer to employ is to treat the filmed electrode, operated as an anode, with D. C. for a short interval of time in a cold film-forming electrolyte. This step may be termed a finishing D. C. surge treatment, and ordinarily will last from 2 to 5 minutes at a voltage substantially equal to the preceding peak forming voltage.

I prefer to employ a saturated aqueous solution of a film-forming acid, such as boric acid, citric acid, tartaric acid, or succinic acid, etc. A saturated aqueous solution of boric acid, which I ordinarily prefer to employ, will have a specific resistance of about 21,000 ohms/cm$^3$, at 25° C.

indicating a low hydroxyl ion concentration and avoidance of sparking of exposed films at quite high voltage.

Omission of this D. C. surge treatment in a cold electrolyte will result in a film having a higher power loss than when the treatment is given, and this is particularly true with respect to films designed to operate at 220 volts or higher. Hence the finishing step is important in securing a film of high efficiency, although not essential in securing a film of good stability.

After washing and drying of the electrode it is in condition for assembly in a condenser in the usual manner.

The various steps which I have set forth, while separately valuable, are not merely cumulative when employed in the combination of steps described, but mutually contribute in an associative manner to enable a dielectric film of unusual properties to be obtained.

When double-layer type electrodes are formed utilizing in full sequence of steps which I have described, and assembled in condensers by employing the improved type of electrolyte described in my copending application Ser. No. 711,286, filed of even date herewith, and since issued as Patent No. 1,986,779, condensers are obtained which can be operated indefinitely at high voltages without heating, without change of capacity, and with an extremely low power loss.

A particularly advantageous feature is that condensers for alternating current use may be made up in this manner which can be successfully utilized for power factor correction of electrical equipment operated at commercial voltages, an objective which has long been sought. Such condensers require no negative bias superposed upon the electrolyte to prevent deterioration of the dielectric film, and may be operated indefinitely, either continuously or with idling periods, without heating and without change of capacity or other sign of a deteriorating dielectric. These condensers can be operated at voltages of 100–440 and higher across opposing electrodes and hence do not need to be connected in a series hook-up for ordinary commercial line voltages.

What I claim is as follows:

1. In a method of forming a filming-metal electrode, the steps comprising subjecting the electrode body to D. C. treatment in a hot viscous semi-dry hydrolyzable film-forming electrolyte, subjecting the electrode to A. C. treatment in the same type of hot electrolyte, thereby obtaining a low power loss film, washing the electrode to hydrolyze portions of the electrolyte retained by the film, and subjecting the electrode to a D. C. surge treatment in a cold film-forming electrolyte.

2. In a method of forming a filming-metal electrode, the steps comprising subjecting the electrode body to D. C. treatment in a hot viscous semi-dry hydrolyzable film-forming electrolyte at a peak voltage substantially greater than the peak service voltage at which the electrode is to be employed, subjecting the electrode to A. C. treatment in the same type of hot electrolyte at a peak voltage about equal to said D. C. peak voltage, thereby obtaining a low power loss film, washing the electrode to hydrolyze portions of the electrolyte retained by the film, and subjecting the electrode to a D. C. surge treatment at a voltage about equal to said D. C. peak voltage in a cold film-forming electrolyte of sufficiently high specific resistance to prevent sparking.

3. In a method of forming a filming-metal electrode, the steps comprising subjecting the electrode body to D. C. treatment in a hot viscous semi-dry hydrolyzable film-forming electrolyte at a peak voltage substantially greater than the peak service voltage at which the electrode is to be employed, subjecting the electrode to A. C. treatment in the same type of hot electrolyte at a peak voltage about equal to said D. C. peak voltage, thereby obtaining a low power loss film, washing the electrode to hydrolyze portions of the electrolyte retained by the film, and subjecting the electrode to a D. C. surge treatment in a cold aqueous solution of a substantially pure film-forming acid.

4. In a method of forming a filming-metal electrode, the steps comprising subjecting the electrode body to D. C. treatment in a hot viscous semi-dry hydrolyzable film-forming electrolyte at a peak voltage substantially greater than the peak service voltage at which the electrode is to be employed, subjecting electrode to A. C. treatment in the same type of hot electrolyte at a peak voltage about equal to said D. C. peak voltage, thereby obtaining a low power loss film, washing the electrode to hydrolyze portions of the electrolyte retained by the film, and subjecting the electrode to a D. C. surge treatment in a cold aqueous solution of a substantially pure film-forming acid.

5. In a method of forming a filming-metal electrode, the steps comprising electrolyzing the electrode body in a hot viscous semi-dry hydrolyzable film-forming electrolyte at a peak voltage substantially in excess of the peak service voltage at which the electrode is to be employed, and washing the electrode to hydrolyze portions of the electrolyte retained by it.

6. In a method of forming a filming-metal electrode, the steps of forming a substantially non-hydratable dielectric film on the electrode, coating the film with a viscous semi-dry hydrolyzable film-forming electrolyte, and washing the electrode to hydrolyze portions of the electrolyte retained by the film.

7. In a method of forming a filming-metal electrode, the steps of forming a substantially non-hydratable dielectric film on the electrode, coating the film with a viscous semi-dry hydrolyzable film-forming electrolyte, washing the electrode to hydrolyze portions of the electrolyte retained by the film, and subjecting the electrode to a D. C. surge treatment in a cold film-forming electrolyte.

8. In a method of forming a filming-metal electrode, the step of electrolyzing the electrode in a hot viscous semi-dry film-forming electrolyte bath maintained at a temperature at least equal to about 85° C., at an A. C. peak voltage substantially in excess of the peak service voltage at which the electrode is to be employed.

9. In a method of forming a filming-metal electrode, the steps of electrolyzing the electrode body in a hot viscous semi-dry film-forming electrolyte bath maintained at a temperature at least equal to about 85° C., first with D. C. and then with A. C. at peak voltages about equal to each other and substantially in excess of the peak service voltage at which the electrode is to be employed.

10. In a method of forming a filming-metal electrode, the step of electrolyzing the electrode in a hot viscous semi-dry film-forming electrolyte having a specific resistance of at least about 1,500 ohms/cm$^3$ at the temperature employed.

11. In a method of forming a filming-metal electrode, the step of electrolyzing the electrode in a hot viscous semi-dry film-forming electrolyte having a specific resistance of about 1,500–10,000 ohms/cm³ at the temperature employed.

12. In a method of forming a filming-metal electrode, the step of subjecting the electrode to A. C. treatment in a hot viscous semi-dry film-forming electrolyte having a specific resistance of at least about 1,500 ohms/cm³ at the temperature employed.

13. In a method of forming a filming-metal electrode, the step of subjecting the electrode to A. C. treatment in a hot viscous semi-dry film-forming electrolyte having a specific resistance of about 1,500–10,000 ohms/cm³ at the temperature employed, at a peak voltage substantially in excess of the peak service voltage at which the electrode is to be employed.

14. In a method of forming a filming-metal electrode, the step of electrolyzing the electrode in a hot viscous semi-dry film-forming electrolyte consisting essentially of a reaction and polymerization product of a water soluble polyhydric alkyl compound and a water soluble polybasic film-forming acid, said electrolyte having a hydroxyl ion concentration adjusted to impart a substantially reduced specific resistance not less than about 1,500 ohms/cm³ at the temperature employed.

15. In a method of forming a filming-metal electrode, the step of electrolyzing the electrode in a hot viscous semi-dry film-forming electrolyte consisting essentially of a homogeneous plastic reaction and polymerization product of a lower polyhydric alcohol and an acid of the class consisting of boric acid, citric acid, and tartaric acid, with sufficient admixed material of the class consisting of water soluble bases and alkali salts of film-forming acids to impart to the electrolyte a reduced specific resistance insufficiently low to cause sparking of the electrode.

16. In a method of forming a filming-metal electrode, the step of subjecting the electrode to A. C. treatment at a temperature of about 85–95° C. in a viscous semi-dry film-forming electrolyte having a specific resistance of about 1,500–10,000 ohms/cm³ at 90° C.; said electrolyte consisting essentially of a reaction and polymerization product of boric acid and a polyhydric alcohol of the class consisting of diethylene glycol and glycerol, with admixed sodium tetraborate.

17. In a method of forming a filming-metal electrode, the steps comprising electrolyzing the electrode in a hot viscous semi-dry film-forming electrolyte at a peak voltage substantially in excess of the peak service voltage at which the electrode is to be employed, thereby obtaining a low power loss film, and subjecting the electrode to a D. C. surge treatment in a cold film-forming electrolyte at a peak voltage about equal to the peak voltage utilized in the aforesaid step.

18. In a method of forming a filming-metal electrode, the steps comprising subjecting the electrode to A. C. treatment in a hot viscous semi-dry film-forming electrolyte at a peak voltage substantially in excess of the peak service voltage at which the electrode is to be operated, thereby obtaining a low power loss film, and subjecting the electrode to a D. C. surge treatment in a cold aqueous film-forming electrolyte having a high specific resistance, at a peak voltage about equal to the peak voltage utilized in the aforesaid step.

19. In a method of forming a filming-metal electrode, the steps comprising subjecting the electrode to D. C. treatment in a hot viscous semi-dry film-forming electrolyte, subjecting the electrode to A. C. treatment in a hot electrolyte of the same type, thereby obtaining a low power loss film, and subjecting the electrode to a D. C. surge treatment in a cold film-forming electrolyte consisting of a substantially pure saturated aqueous solution of a water soluble film-forming acid.

20. The method of forming a double-layer type of electrode especially adapted for use in electrolytic condensers for continuous operation on alternating current at high voltages, comprising the steps of electrolyzing an aluminum electrode in about 1/10 normal phosphoric acid to produce a protective layer thereon, washing the electrode to remove traces of the acid, subjecting the electrode to A. C. treatment in a hot viscous semi-dry film-forming electrolyte, and subjecting the electrode to a D. C. surge treatment in a cold film-forming electrolyte of sufficient specific resistance to prevent sparking.

JULIUS EDGAR LILIENFELD.